(12) United States Patent
Lindqvist et al.

(10) Patent No.: US 10,768,322 B2
(45) Date of Patent: Sep. 8, 2020

(54) ANALOGOUS PROCESSING OF MODELED AND MEASURED MARINE SURVEY DATA

(71) Applicant: PGS Geophysical AS, Oslo (NO)

(72) Inventors: Ulf Peter Lindqvist, Kista (SE); Lars Erik Magnus Bjornemo, Kista (SE)

(73) Assignee: PGS Geophysical AS, Oslo (NO)

( * ) Notice: Subject to any disclaimer, the term of this patent is extended or adjusted under 35 U.S.C. 154(b) by 172 days.

(21) Appl. No.: 15/181,753

(22) Filed: Jun. 14, 2016

(65) Prior Publication Data

US 2017/0059726 A1 Mar. 2, 2017

Related U.S. Application Data

(60) Provisional application No. 62/210,638, filed on Aug. 27, 2015.

(51) Int. Cl.
| | | |
|---|---|---|
| *G01V 1/00* | (2006.01) | |
| *G01V 1/28* | (2006.01) | |
| *G01V 1/38* | (2006.01) | |
| *G01V 3/08* | (2006.01) | |

(52) U.S. Cl.
CPC ............... *G01V 1/282* (2013.01); *G01V 1/38* (2013.01); *G01V 3/083* (2013.01)

(58) Field of Classification Search
CPC ........... G01V 1/282; G01V 1/38; G01V 3/083
USPC .......................................................... 702/16
See application file for complete search history.

(56) References Cited

U.S. PATENT DOCUMENTS

| 8,143,897 B2 | 3/2012 | Ziolkowski | |
|---|---|---|---|
| 10,002,211 B2 * | 6/2018 | Krebs ..................... | G01V 11/00 |
| 2010/0042391 A1 * | 2/2010 | Shin ........................ | G01V 1/282 |
| | | | 703/6 |
| 2011/0090760 A1 * | 4/2011 | Rickett ................... | G01V 1/282 |
| | | | 367/73 |
| 2011/0235464 A1 | 9/2011 | Brittan et al. | |
| 2012/0143575 A1 * | 6/2012 | Imhof ..................... | G01V 11/00 |
| | | | 703/2 |
| 2012/0215506 A1 * | 8/2012 | Rickett ................... | G01V 1/282 |
| | | | 703/6 |
| 2012/0314538 A1 | 12/2012 | Washbourne et al. | |
| 2013/0085731 A1 | 4/2013 | De Stefano et al. | |
| 2013/0121109 A1 * | 5/2013 | Baardman ............... | G01V 1/36 |
| | | | 367/24 |
| 2014/0372044 A1 * | 12/2014 | Jiao ........................ | G01V 1/282 |
| | | | 702/16 |
| 2014/0379266 A1 * | 12/2014 | Jiao ........................ | G01V 1/362 |
| | | | 702/17 |
| 2016/0238722 A1 * | 8/2016 | Vdovina ................. | G01V 1/282 |
| 2016/0274256 A1 * | 9/2016 | Coates ..................... | G01V 1/282 |
| 2016/0282490 A1 * | 9/2016 | Qin ......................... | G01V 1/282 |

(Continued)

OTHER PUBLICATIONS

Marques, et al., "Solving Large Linear Inverse Problems in Geophysics by means of Eigenvalue Calculations" Received: Jan. 11, 2016 (11 pgs) http://crd-legacy.lbl.gov/~osni/Papers/LBNL-45324.pdf.

*Primary Examiner* — Michael P Nghiem (57) ABSTRACT

Measured marine survey data can be processed analogously to modeled marine survey data analogously and a misfit can be calculated between the processed measured marine survey data and the processed modeled marine survey data. A model parameter in the modeled marine survey data can be updated based on the misfit. The model parameter can be a parameter of a subsurface location.

23 Claims, 4 Drawing Sheets

(56) References Cited

U.S. PATENT DOCUMENTS

| | | | |
|---|---|---|---|
| 2017/0010373 A1* | 1/2017 | Ayeni | G01V 1/282 |
| 2017/0059734 A1* | 3/2017 | Mattsson | G01V 3/083 |
| 2017/0075008 A1* | 3/2017 | Westerdahl | G01V 1/364 |
| 2017/0108604 A1* | 4/2017 | Turquais | G01V 1/364 |
| 2017/0115418 A1* | 4/2017 | Gratacos | G01V 1/364 |
| 2017/0115422 A1* | 4/2017 | Kitazawa | G01V 1/50 |
| 2017/0248714 A1* | 8/2017 | Rickett | G01V 1/282 |
| 2017/0276817 A1* | 9/2017 | van Groenestijn | G01V 1/364 |
| 2017/0285199 A1* | 10/2017 | Harrick | G01V 1/38 |
| 2017/0299743 A1* | 10/2017 | Kluver | G01V 1/36 |
| 2017/0299746 A1* | 10/2017 | Hegna | G01V 1/364 |
| 2017/0371054 A1* | 12/2017 | Oukili | G01V 1/362 |

\* cited by examiner

ANALOGOUS PROCESSING OF MODELED AND MEASURED MARINE SURVEY DATA

CROSS-REFERENCE TO RELATED APPLICATIONS

This application claims priority to U.S. Provisional Application 62/210,638, filed Aug. 27, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. In some instances, each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source. In some instances, each signal is essentially a field that is imparted into the subterranean formation, which can induce a different field in response. The receivers can measure the different field that was induced by the actuation of the source.

DETAILED DESCRIPTION

The present disclosure is related to analogous processing of modeled and measured marine survey data. In some inversion processes, measured marine survey data that has been processed can be compared with modeled marine survey data. Inversion starts with measured marine survey data, applies an operation that steps backward through the survey, and produces a model of the subsurface. Modeled marine survey data is synthetic data used for comparison, simulation, or representation of measured marine survey data in order to assess the ambiguity of interpretation of the measured marine survey data and/or to make predictions. For example, modeled marine survey data can comprise a model of the structures and distributions of features and materials underlying the surface of the earth. As another example, modeled marine survey data can comprise a synthetic seismogram generated from a well log that can be compared with measured marine survey data in a direct modeling procedure.

Measured marine survey data can be compared with modeled marine survey data using a mathematical representation of the physics that determine the distribution of model parameters, such as some physical properties. For example, in seismic full waveform inversion, the model parameters used for the comparison can be an elasto-mechanical property distribution, while in controlled source electromagnetics (CSEM), the model parameters can be a resistivity distribution. Data from the inversion can be analyzed, for example by imaging, to aid in the understanding of a subsurface location and thereby to better predict the nature and location of hydrocarbons.

In both seismic full waveform inversion and in CSEM, the result can be a spatial distribution of some physical model parameters that can correspond to a functional mapping of the real world. Stated differently, an inversion can yield a model parameter distribution for a survey area that can reproduce measured marine survey data and/or modeled marine survey data. Although there can be difficulties associated with finding the "correct distribution," by repeating the inversion multiple times with different initial conditions, a probability distribution can be mapped.

In some inversion processes, processed measured marine survey data can be compared to modeled marine survey data based on some initial model parameters. The initial model parameters can be modified in a direction where the misfit between the measured marine survey data and the modeled marine survey data is reduced, for example, where the misfit is smaller and/or or better. Misfit between data is a difference between the data. This process can be repeated iteratively, for example, until a better model parameter update cannot be found and/or the misfit is determined to be within a misfit threshold. The misfit threshold is an amount of difference between data that is deemed to be acceptable in a particular implementation.

In some inversion processes, the raw measured marine survey data can be processed (e.g., manipulated), for example, because receivers may not provide a preferred input quantity and/or data quality. The input quantity and/or data quality can be altered and/or improved, for example, by a noise reduction process. Such processing can be implemented as a result of an active decision and with awareness of the simplifications inherent to the processing and the implications of such simplifications. Such processing can add artefacts to the measured marine survey data.

According to at least one embodiment of the present disclosure, the inversion process can incorporate the measured marine survey data processing into processing of the modeled marine survey data. The processing of the modeled marine survey data can be analogous to the processing of the measured marine survey data. In at least one embodiment, modeled marine survey data can receive the same treatment as measured marine survey data before a misfit between the modeled marine survey data and the measured marine survey data is calculated. This can alter (e.g., reduce or minimize) misfit that would otherwise be caused by processing the measured marine survey data without analogously processing the modeled marine survey data. For example, the analogous processing of the modeled marine survey data can compensate for artefacts that are added to the measured marine survey data by the processing of the measured marine survey data. As a result, at least one embodiment of the present disclosure can improve the capabilities of a machine (e.g., a computer) that carries out processing of measured and/or modeled marine survey data by enabling it to reduce or minimize misfit between its processing of measured marine survey data and modeled marine survey data, particularly in comparison to some approaches to inversion that do not process modeled marine survey data and measured marine survey data analogously.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
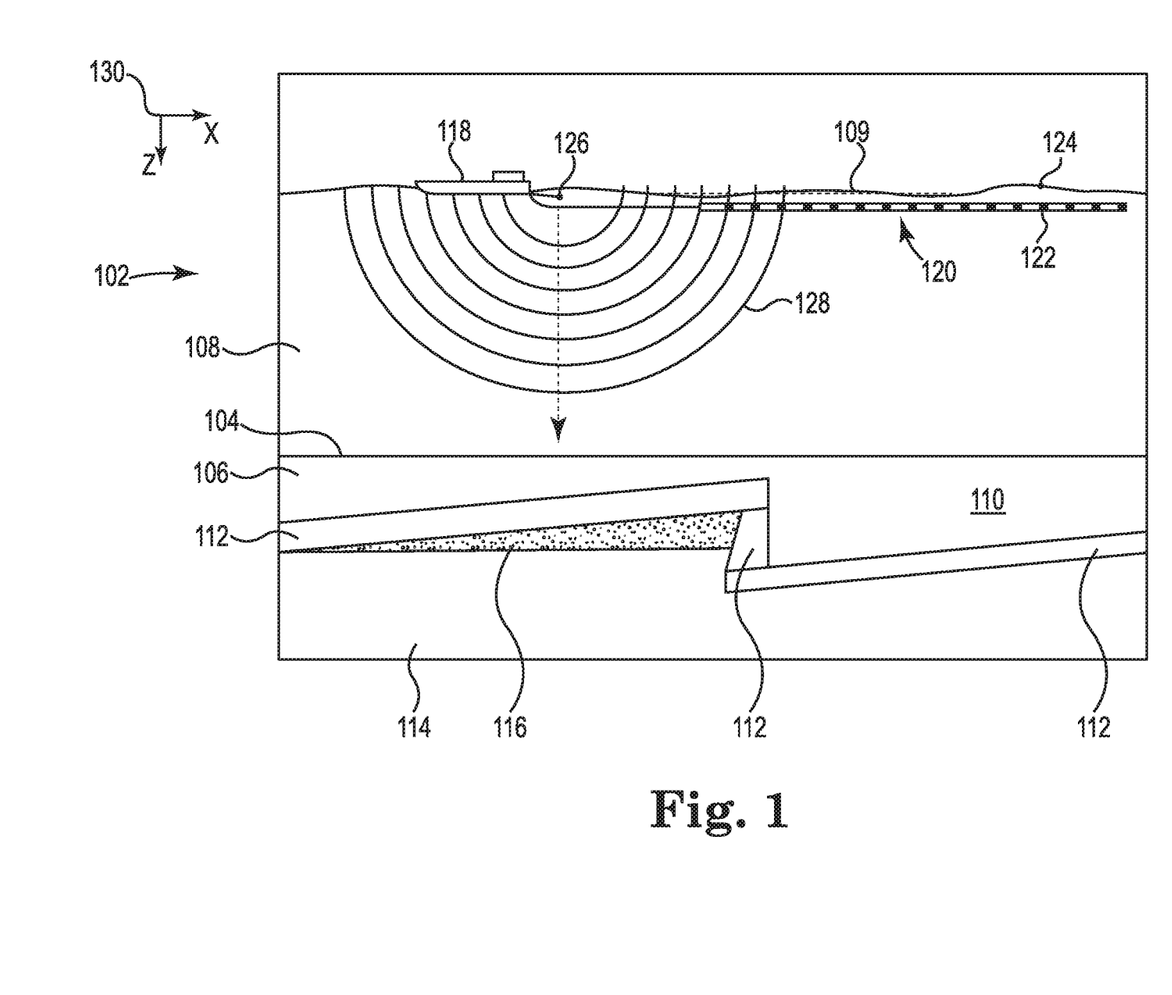
FIG. 1 illustrates an elevation or xz-plane view of marine surveying in which signals are emitted by a source for recording by receivers for processing and analysis in order to help characterize the structures and distributions of features and materials underlying the surface of the earth.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. For example, such processing can include analogous processing of modeled and measured marine survey data. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 may also be towed by other vessels, or may be otherwise disposed in fluid volume 108. For example, receivers may be located on ocean bottom cables or nodes fixed at or near the surface 104, and sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Data collected by receivers is referred to herein as measured marine survey data. Before the marine survey data is processed, it is referred to as raw measured marine survey data.

FIG. 1 shows an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
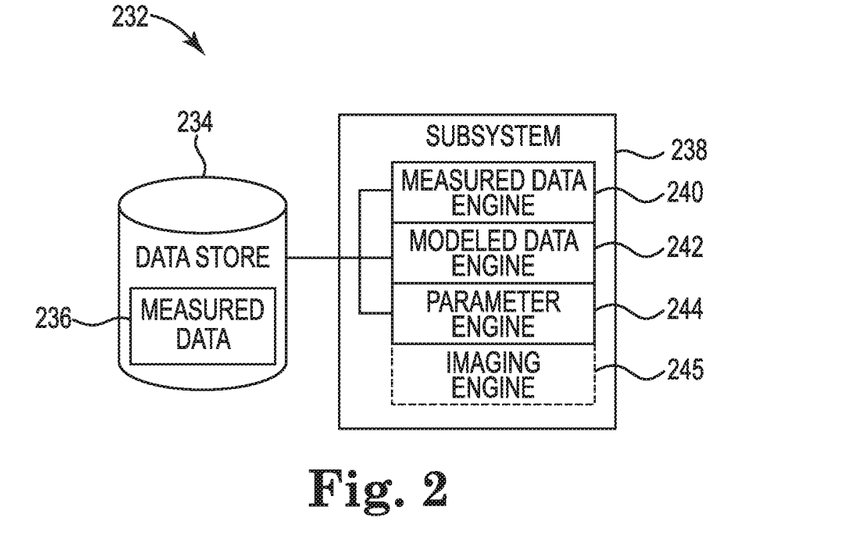
FIG. 2 illustrates a diagram of a system for analogous processing of modeled and measured marine survey data.

FIG. 2 illustrates a diagram of a system 232 for analogous processing of modeled and measured marine survey data. The system 232 can include a data store 234, a subsystem 238, and/or a number of engines (e.g., measured data engine 240, modeled data engine 242, and/or parameter engine 244) and can be in communication with the data store 234 via a communication link. The data store 234 can store measured marine survey data 236. The system 232 can include additional or fewer engines than illustrated to perform the various functions described herein. The system can represent program instructions and/or hardware of a machine (e.g., machine 346 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. For example, the measured data engine, the modeled data engine, and the parameter engine can be one or more hardware components of a machine. As another example, the measured data engine, the modeled data engine, and the parameter engine can be implemented by a machine that reads and executes instructions to provide functionality of the measured data engine, the modeled data engine, and the parameter engine.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The measured data engine 240 can include a combination of hardware and program instructions that is configured to process measured marine survey data. The measured data engine 240 can be configured to transfer information about data dependent processing of the measured marine survey data to the modeled data engine 242. Data and/or noise dependent processing is in some way adapted to the data values, for instance a low-rank reconstruction based on a singular value decomposition (SVD). Such processing generally cannot be correctly emulated before receipt of the measured marine survey data. By contrast, data and/or noise independent processing is the same in application for different data sets. For example, a low-pass filter. Such operations, that are independent of the measured marine survey data values, can be reproduced and applied to modeled marine survey data without access to the measured marine survey data. Information about data dependent processing is information that identifies the adaptation of the data dependent processing to the data values such that different data can be processed consistently. An example of information about data dependent processing is a basis function used in a low-rank SVD reconstruction, which can be used to process the modeled marine survey data before a parametric inversion.

The measured data engine 240 can be configured to transfer information about noise dependent processing of the measured marine survey data to the modeled data engine 242. For example, the information about noise dependent processing can be noise or a parameter of modeled noise from the noise dependent processing. A parameter of modeled noise is its power spectral density as estimated in the processing, or a specific parametric model that in some way represents noise properties. One example of the latter is a stochastic auto-regressive (AR) model that reduces the relevant noise properties to a small number of model parameters. As another example, the information about noise dependent processing can be data from auxiliary sensors, which in at least one embodiment comprises noise. Auxiliary sensors are sensors other than the receivers that are used to receive reflected energy from a source (such as the receivers 122 illustrated in FIG. 1). Auxiliary sensors can be used for noise reduction. In at least one embodiment, the information about noise dependent processing can be from an adaptive noise estimator.

In at least one embodiment, the measured data engine 240 can analyze the processing of the measured marine survey data to determine how the raw measured marine survey data is modified as a result of the processing. For example, spatial compensation can be applied to measured marine survey data pre-processing, during processing, and/or post-processing to account for spatially distributed receivers. As another example, time compensation can be applied to measured marine survey data pre-processing, during processing, and/or post-processing in applications where the marine survey system (sources and/or receivers) is not stationary.

The modeled data engine 242 can include a combination of hardware and program instructions that is configured to process modeled marine survey data analogously to the processing of the measured marine survey data (by the measured data engine 240). The modeled data engine 242 can be configured to process the modeled survey data using information about data dependent processing received from the measured data engine 240. For example, the modeled data engine 242 can be configured to use the information, comprising a basis function for a low-rank SVD reconstruction, so that the modeled marine survey data can be mapped onto the same basis functions. A basis function is an element of a function space, where every continuous function in the function space can be represented as a linear combination of basis functions. An SVD is a factorization of a real or complex matrix. A low-rank SVD is a low-rank approximation, which is a minimization problem in which a cost function measures the fit between a data matrix and an approximating matrix, where the approximating matrix has a reduced rank. The SVD of the data matrix is an analytic solution to an unstructured problem with fit. A low-rank SVD reconstruction is the reconstruction of a wavefield that has been modified, for example, after using a low-rank SVD to filter noise.

The modeled data engine 242 can use the information, comprising data from auxiliary sensors to model the modeled marine survey data based on a correlation between the auxiliary sensors and the measured marine survey data. In at least one embodiment, the modeled data engine 242 can be configured to model a coupling between the auxiliary sensors and noise in the measured marine survey data. The modeled data engine 242 can be configured to replicate the noise reduction on the modeled marine survey data. In at least one embodiment, the modeled data engine 242 can be configured to generate modeled noise based on the information about noise dependent processing prior to the processing of the modeled marine survey data. The modeled data engine 242 can generate modeled noise with the modeled marine survey data and perform the noise reduction thereon analogously to noise reduction performed by the measured marine survey data engine 240. Data and/or noise independent processing, such as stacking or averaging, can be applied directly to modeled marine survey data (without receiving information from the measured data engine 240) analogously to data and/or noise independent processing of the measured marine survey data.

The parameter engine 244 can include a combination of hardware and program instructions that is configured to calculate a misfit between the processed measured marine survey data and the processed modeled marine survey data. The parameter engine 244 can be configured to update a model parameter in the modeled marine survey data based on the misfit. In at least one embodiment, the model parameter is a parameter of a subsurface location, such that the model parameters of the modeled marine survey data represent physical parameters of the subsurface location. For example, the parameter can be an elasto-mechanical property distribution or a resistivity distribution, among other properties. In at least one embodiment, the parameter engine 244 can be configured to iteratively calculate the misfit and update the model parameter until the misfit is within a misfit threshold. Although not specifically illustrated, the system 232 can include an imaging engine 245 that includes a combination of hardware and program instructions that is configured to determine a spatial distribution of the parameter of the subsurface location as a map of the subsurface location.

Figure 3:
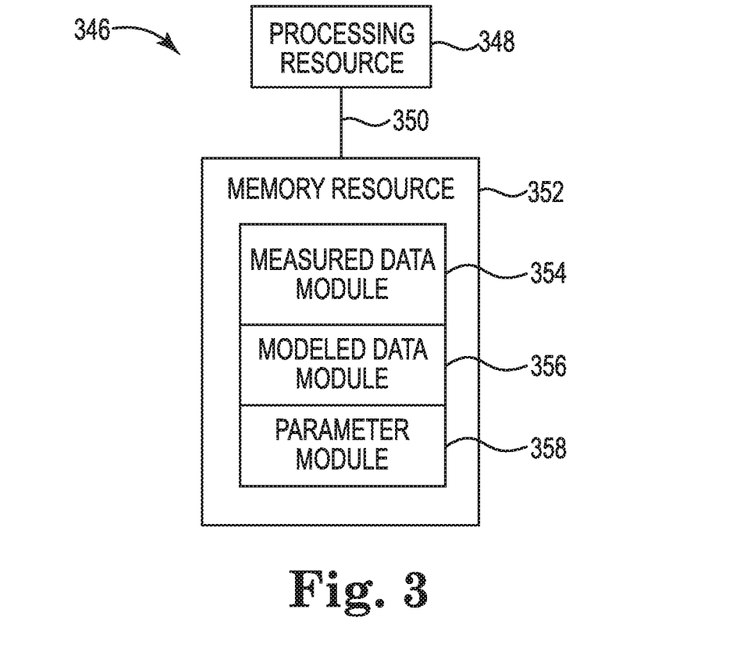
FIG. 3 illustrates a diagram of a machine for analogous processing of modeled and measured marine survey data.

FIG. 3 illustrates a diagram of a machine 346 for analogous processing of modeled and measured marine survey data. The machine 346 can utilize software, hardware, firmware, and/or logic to perform a number of functions. The machine 346 can be a combination of hardware and program instructions configured to perform a number of functions (e.g., actions). The hardware, for example, can include a number of processing resources 348 and one or more memory resources 352, such as a machine-readable medium or other non-transitory memory resources 352. The memory resources 352 can be internal and/or external to the machine 346, for example, the machine 346 can include internal memory resources and have access to external memory resources. The program instructions, such as machine-readable instructions, can include instructions stored on the machine-readable medium to implement a particular function, for example, an action such as removal of an estimated acquisition effect from a marine survey measurement. The set of machine-readable instructions can be executable by one or more of the processing resources 348. The memory resources 352 can be coupled to the machine 346 in a wired and/or wireless manner. For example, the memory resources 352 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 352 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 348 can be coupled to the memory resources 352 via a communication path 350. The communication path 350 can be local or remote to the machine 346. Examples of a local communication path 350 can include an electronic bus internal to a machine, where the memory resources 352 are in communication with the processing resources 348 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 350 can be such that the memory resources 352 are remote from the processing resources 348, such as in a network connection between the memory resources 352 and the processing resources 348. That is, the communication path 350 can be a network connection. Examples of such a network connection can include a local area network, wide area network, personal area network, and the Internet, among others.

As shown in FIG. 3, the machine-readable instructions stored in the memory resources 352 can be segmented into a number of modules 354, 356, 358 that when executed by the processing resources 348 can perform a number of functions. As used herein a module includes a set of instructions included to perform a particular task or action. The number of modules 354, 356, 358 can be sub-modules of other modules. For example, the measured data module 354 can be a sub-module of the modeled data module 356 and/or the measured data module 354 and the modeled data module 356 can be contained within a single module. Furthermore, the number of modules 354, 356, 358 can comprise individual modules separate and distinct from one another. Examples are not limited to the specific modules 354, 356, 358 illustrated in FIG. 3.

Each of the number of modules 354, 356, 358 can include program instructions and/or a combination of hardware and program instructions that, when executed by a processing resource 348, can function as a corresponding engine as described with respect to FIG. 2. For example, the measured data module 354 can include program instructions and/or a combination of hardware and program instructions that, when executed by a processing resource 348, can function as the measured data engine 240, the modeled data module 356 can include program instructions and/or a combination of hardware and program instructions that, when executed by a processing resource 348, can function as the modeled data engine 242, and/or the parameter module 358 can include program instructions and/or a combination of hardware and program instructions that, when executed by a processing resource 348, can function as the parameter engine 244.

The machine 346 can include a measured data module 354, which can include instructions to process measured marine survey data. Prior to being processed, the measured marine survey data can be referred to as raw measured marine survey data. The measured data module 354 can include instructions to reprocess the measured marine survey data analogously to the reprocessing of the modeled marine survey data by the modeled data module 356 in response to the calculated misfit (as described below with respect to the parameter module 358) being outside of a misfit threshold. The instructions to process the measured marine survey data can include instructions to process information received from auxiliary sensors.

The machine 346 can include a modeled data module 356, which can include instructions to model marine survey data based on initial model parameters. The modeled data module 356 can include instructions to process the modeled marine survey data analogously to the processing of the measured marine survey data by the measured data module 354. The modeled data module 356 can include instructions to, in response to the calculated misfit (as described below with respect to the parameter module 358) being outside of a misfit threshold, remodel the marine survey data based on the updated model parameters and reprocess the modeled marine survey data analogously to the processing of the measured marine survey data by the measured data module 354. The instructions to model the marine survey data can include instructions to model noise in the marine survey data.

The machine 346 can include a parameter module 358, which can include instructions to calculate a misfit between the processed measured marine survey data and the processed modeled marine survey data. The parameter module 358 can include instructions to, in response to the misfit being outside of a misfit threshold, update at least one of the model parameters to reduce the misfit and, after the modeled marine survey data is remodeled and the modeled marine survey data and the measured marine survey data are reprocessed analogously, recalculate the misfit until the misfit is within the misfit threshold. The parameter module 358 can include instructions to, in response to the misfit being within the misfit threshold, report final model parameters. The instructions to update at least one of the model parameters can include instructions to update a parameter of the modeled noise. The parameter module 358 can include instructions to, in response to the misfit being within the misfit threshold, determine a spatial distribution of the parameter of the subsurface location as a map of the subsurface location.

In accordance with a number of embodiments of the present disclosure, a geophysical data product may be produced. The geophysical data product may include, for example, an updated model parameter in modeled marine survey data. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. Measured marine survey data can be processed and modeled marine survey data can be processed analogously to the processing of the measured marine survey data, for example as the measured marine survey data is being acquired or after it is acquired offshore to facilitate other processing of the marine survey data either offshore or onshore. As another example, a misfit between the processed measured marine survey data and the processed modeled marine survey data can be calculated, for example as it is being acquired or after it is acquired, offshore to facilitate other processing of the marine survey data either offshore or onshore. As another example, a model parameter in the modeled marine survey data can be updated based on the misfit, for example as it is being acquired or after it is acquired, offshore to facilitate other processing of the marine survey data either offshore or onshore. In at least one embodiment, the parameter is a parameter of a subsurface location.

Figure 4:
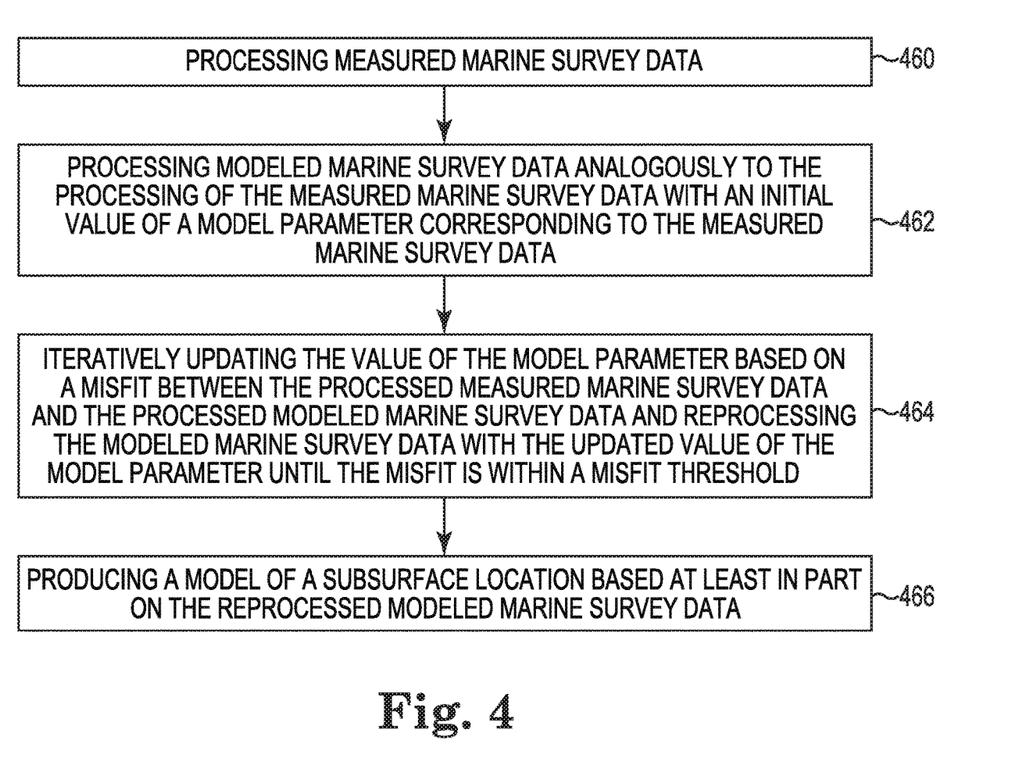
FIG. 4 illustrates a method flow diagram for analogous processing of modeled and measured marine survey data.

FIG. 4 illustrates a method flow diagram for analogous processing of modeled and measured marine survey data. At block 460, the method can include processing measured marine survey data. Processing the measured marine survey data can include spatially compensating the measured marine survey data for spatially distributed receivers. Spatially compensating the measured marine survey data can adjust the measured marine survey data to represent data that would be measured if the receivers were not spatially distributed. Processing the measured marine survey data can include compensating the measured marine survey data for time for a marine survey system that is not stationary. Compensating the measured marine survey data for time can adjust the measured marine survey data to represent data that would be measured if the system were stationary. In at least one embodiment, the method can include conducting a marine survey to acquire the measured marine survey data or acquiring the measured marine survey data from a third party.

At block 462, the method can include processing modeled marine survey data analogously to the processing of the measured marine survey data with an initial value of a model parameter corresponding to the measured marine survey data. Processing the modeled marine survey data can include spatially compensating the modeled marine survey data analogously to the spatial compensation of the measured marine survey data. Processing the modeled marine survey data can include compensating the modeled marine survey data for time analogously to the time compensation of the measured marine survey data. Processing the modeled marine survey data analogously to the processing of the measured marine survey data can include data and noise independent processing of the modeled marine survey data directly and data dependent or noise dependent processing of the modeled marine survey data based on information about data dependent or noise dependent processing of the measured marine survey data. The method can include generating modeled noise based on the information about noise dependent processing, where processing the modeled marine survey data includes processing the modeled noise.

At block 464, the method can include iteratively updating the value of the model parameter based on a misfit between the processed measured marine survey data and the processed modeled marine survey data and reprocessing the modeled marine survey data with the updated value of the model parameter until the misfit is within a misfit threshold. The method can include calculating the misfit between the processed measured marine survey data and the processed modeled marine survey data after processing the modeled marine survey data analogously to the processing of the measured marine survey data. At block 466, the method can include producing a model of a subsurface location based at least in part on the reprocessed modeled marine survey data. In at least one embodiment, the model of the subsurface location can also be based on the measured marine survey data.

Figure 5:
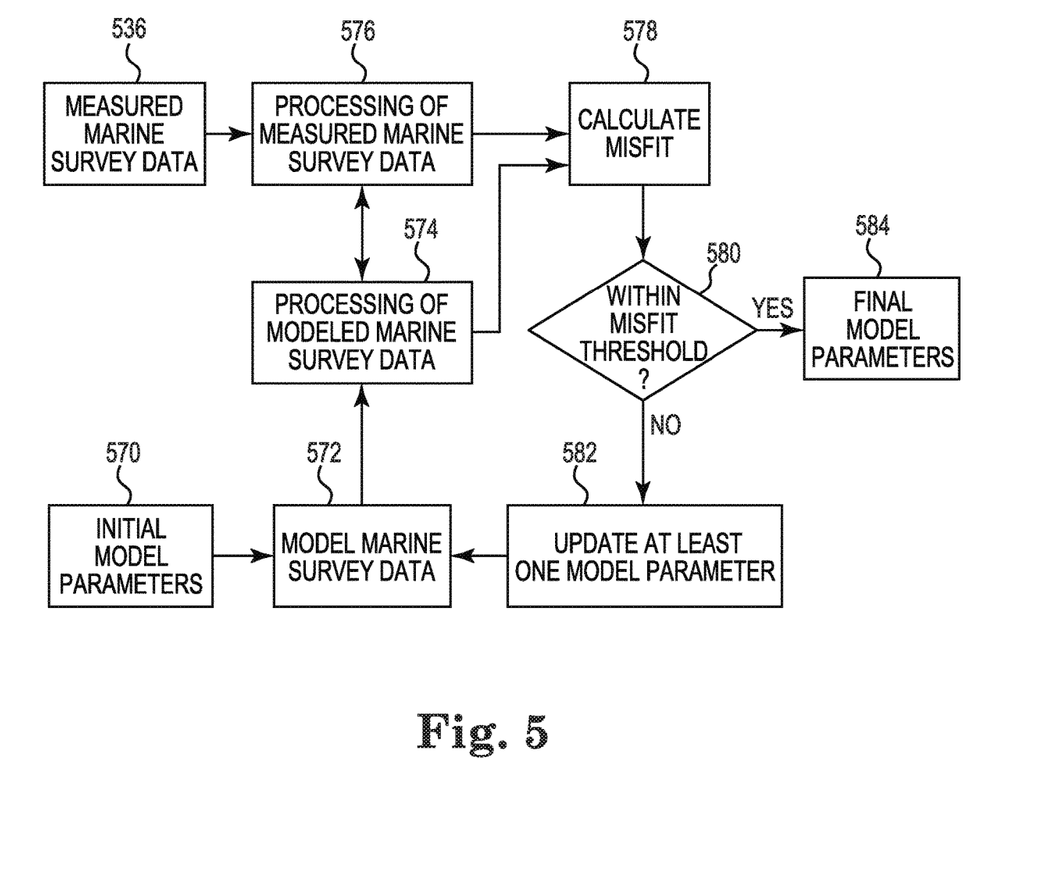
FIG. 5 illustrates a method flow diagram for analogous processing of modeled and measured marine survey data.

FIG. 5 illustrates a method flow diagram for analogous processing of modeled and measured marine survey data. At block 570, initial model parameters can be used to model marine survey data at block 572. The modeled marine survey data can be input to the processing of the modeled marine survey data at block 574. At block 536, measured marine survey data can be input to the processing of measured marine survey data at block 576. As indicated by the bidirectional arrows between blocks 574 and 576, the processing of the modeled marine survey data is analogous to the processing of the measured marine survey data.

At block 578, a misfit can be calculated between the processed measured marine survey data and the processed modeled marine survey data. At block 580, a determination can be made as to whether the misfit is within a misfit threshold. If the misfit is not within the threshold, at block 582, at least one model parameter can be updated in the modeled marine survey data at block 572. The modeled marine survey data with the updated parameter can be reprocessed analogously to the processing of the measured marine survey data as indicated by the bidirectional arrow between blocks 574 and 576. The misfit for the processed measured marine survey data and the reprocessed modeled marine survey data can be recalculated at block 578. At block 580, a determination can be made as to whether the recalculated misfit is within a misfit threshold. If the misfit is not within the threshold, at block 582, at least one model parameter can be updated in the modeled marine survey data at block 572, and this can continue iteratively until the recalculated misfit is within the misfit threshold. At block 580, when the misfit (or recalculated misfit) is within the misfit threshold, final model parameters can be reported at block 584.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   measured marine survey data;
   a measured data engine configured to process the measured marine survey data, wherein processing the measured marine survey data includes:
     noise independent processing of the measured marine survey data; and
     data dependent or noise dependent processing of the measured marine survey data;
   a modeled data engine configured to process modeled marine survey data analogously to the processing of the measured marine survey data to reduce a misfit between the processed measured marine survey data and the processed modeled marine survey data that would otherwise be caused by processing the measured marine survey data without analogously processing the modeled marine survey data, wherein processing the modeled marine survey data includes:
     noise independent processing of the modeled marine survey data analogously to the noise independent processing of the measured marine survey data by the measured data engine; and
     data dependent or noise dependent processing of the modeled marine survey data analogously to the data dependent or noise dependent processing of the measured marine survey data by the measured data engine;
   a parameter engine configured to:
     calculate the misfit between the processed measured marine survey data and the processed modeled marine survey data; and
     update a model parameter in the modeled marine survey data based on the misfit, wherein the model parameter comprises a parameter of a subsurface location; and
   an imaging engine configured to produce a spatial distribution of the model parameter as a map of the subsurface location to better predict a nature or location of hydrocarbons associated with the subsurface location;
   wherein each of the engines comprises hardware as a physical component of the system that enables performance of recited functionality.

2. The system of claim 1, wherein the measured data engine is configured to transfer information about the data dependent processing of the measured marine survey data to the modeled data engine; and
   wherein the modeled data engine is configured to process the modeled marine survey data using the information about the data dependent processing.

3. The system of claim 2, wherein the information comprises a basis function used in a low-rank singular value decomposition reconstruction; and
   wherein the data dependent processing comprises an inversion.

4. The system of claim 2, wherein the information comprises data from auxiliary sensors; and
   wherein the modeled data engine is configured to model the modeled marine survey data based on a correlation between the auxiliary sensors and the measured marine survey data.

5. The system of claim 1, wherein the measured data engine is configured to transfer information about the noise dependent processing of the measured marine survey data to the modeled data engine; and
   wherein the modeled data engine is configured to generate modeled noise based on the information about the noise dependent processing prior to the processing of the modeled marine survey data.

6. The system of claim 5, wherein the information about noise dependent processing comprises noise or a model parameter comprising a parameter of modeled noise from the noise dependent processing.

7. The system of claim 1, wherein the parameter of the subsurface location comprises an elasto-mechanical property distribution or a resistivity distribution.

8. The system of claim 1, wherein the parameter engine is configured to iteratively calculate the misfit and update the model parameter until the misfit is within a misfit threshold.

9. The system of claim 1, wherein the modeled data engine is configured to:
   apply the noise independent processing of the modeled marine survey data without receiving information from the measured data engine; and
   apply the data dependent or noise dependent processing of the modeled marine survey data based on information about the data dependent or noise dependent processing of the measured marine survey data.

10. A method, comprising:
    noise independent processing of measured marine survey data by a machine;
    data dependent or noise dependent processing of the measured marine survey data by the machine;
    noise independent processing of modeled marine survey data analogously to the noise independent processing of the measured marine survey data by the machine; and
    data dependent or noise dependent processing of the modeled marine survey data analogously to the data dependent or noise dependent processing of the measured marine survey data by the machine;
    wherein processing the modeled marine survey data analogously to the measured marine survey data reduces a misfit between the processed measured marine survey data and the processed modeled marine survey data that would otherwise be caused by processing the measured marine survey data without analogously processing the modeled marine survey data;

calculating the misfit between the processed measured marine survey data and the processed modeled marine survey data by the machine;

iteratively updating, by the machine, a value of a model parameter based on the misfit between the processed measured marine survey data and the processed modeled marine survey data and reprocessing the modeled marine survey data with the updated value of the model parameter until the misfit is within a misfit threshold; and producing, by the machine, a spatial distribution of the updated value of the model parameter as a map of the subsurface location to better predict a nature or location of hydrocarbons associated with the subsurface location.

11. The method of claim 10, wherein processing the measured marine survey data comprises compensating the measured marine survey data for spatially distributed receivers to represent data that would be measured if the receivers were not spatially distributed; and
wherein processing the modeled marine survey data comprises compensating the modeled marine survey data analogously to the measured marine survey data.

12. The method of claim 10, wherein processing the measured marine survey data comprises compensating the measured marine survey data for time for a marine survey system that is not stationary; and
wherein processing the modeled marine survey data comprises compensating the modeled marine survey data for time analogously to the measured marine survey data.

13. The method of claim 10, wherein calculating the misfit comprises calculating the misfit between the marine survey data and the processed modeled marine survey data after processing the modeled marine survey data analogously to the processing of the measured marine survey data.

14. The method of claim 10, further comprising generating modeled noise based on information about the noise dependent processing of the measured marine survey data; and
wherein processing modeled marine survey data comprises processing the modeled noise.

15. The method of claim 10, further comprising conducting a marine survey to acquire the measured marine survey data or acquiring the measured marine survey data from a third party.

16. A non-transitory machine-readable medium storing instructions, which when executed by a processing resource, cause the processing resource to:
model marine survey data based on initial model parameters;
apply noise independent processing to measured marine survey data;
apply data dependent or noise dependent processing to the measured marine survey data;
apply noise independent processing to modeled marine survey data analogously to the noise independent processing of the measured marine survey data; and
apply data dependent or noise dependent processing to the modeled marine survey data analogously to the data dependent or noise dependent processing of the measured marine survey data;
wherein processing the modeled marine survey data analogously to the measured marine survey data reduce a misfit between the processed measured marine survey data and the processed modeled marine survey data that would otherwise be caused by processing the measured marine survey data without analogously processing the modeled marine survey data;
calculate the misfit between the processed measured marine survey data and the processed modeled marine survey data;
in response to the misfit being outside of a misfit threshold:
update at least one of the model parameters to reduce the misfit;
remodel the marine survey data based on the updated model parameters;
reprocess the modeled marine survey data and measured marine survey data analogously; and
recalculate the misfit until the misfit is within the misfit threshold; and
in response to the misfit being within the misfit threshold:
report final model parameters; and
produce a spatial distribution of the final model parameters as a map of a subsurface location to better predict a nature or location of hydrocarbons associated with the subsurface location.

17. The medium of claim 16, wherein the measured marine survey data, prior to being processed analogously to the modeled marine survey data comprises raw measured marine survey data.

18. The medium of claim 16, wherein the instructions to process the measured marine survey data include instructions to process information received from auxiliary sensors.

19. The medium of claim 16, wherein the instructions to model the marine survey data include instructions to model noise in the marine survey data.

20. The medium of claim 19, wherein the instructions to update at least one of the model parameters comprise instructions to update a parameter of the modeled noise.

21. A method of generating a geophysical data product, the method comprising:
obtaining geophysical data; and
processing the geophysical data to generate the geophysical data product, wherein processing the geophysical data comprises:
noise independent processing of measured marine survey data;
data dependent or noise dependent processing of the measured marine survey data;
noise independent processing of modeled marine survey data analogously to the noise independent processing of the measured marine survey data; and
data dependent or noise dependent processing of the modeled marine survey data analogously to the data dependent or noise dependent processing of the measured marine survey data;
wherein processing the modeled marine survey data analogously to the measured marine survey data reduce a misfit between the processed measured marine survey data and the processed modeled marine survey data that would otherwise be caused by processing the measured marine survey data without analogously processing the modeled marine survey data;
calculating the misfit between the processed measured marine survey data and the processed modeled marine survey data;
updating a model parameter in the modeled marine survey data based on the misfit, wherein the model parameter comprises a parameter of a subsurface location to better predict a nature or location of hydrocarbons associated with the subsurface location; and producing a spatial distribution of the model parameter as a map of the subsurface location to better predict a nature or location of hydrocarbons associated with the subsurface location.

22. The method of claim 21, further comprising recording the geophysical data product on a non-transitory machine-readable medium suitable for importing onshore.

23. The method of claim 21, wherein processing the geophysical data comprises processing the geophysical data offshore or onshore.

* * * * *